United States Patent
Takaku

(10) Patent No.: US 9,153,127 B2
(45) Date of Patent: Oct. 6, 2015

(54) VIDEO TRANSMITTING APPARATUS, VIDEO RECEIVING APPARATUS, AND VIDEO TRANSMISSION SYSTEM

(75) Inventor: Masahiko Takaku, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 660 days.

(21) Appl. No.: 13/487,028

(22) Filed: Jun. 1, 2012

(65) Prior Publication Data
US 2012/0239999 A1 Sep. 20, 2012

Related U.S. Application Data

(63) Continuation of application No. 12/026,671, filed on Feb. 6, 2008, now Pat. No. 8,214,708.

(30) Foreign Application Priority Data

Feb. 6, 2007 (JP) ................................ 2007-027074

(51) Int. Cl.
| | |
|---|---|
| H04L 1/18 | (2006.01) |
| G08C 25/02 | (2006.01) |
| H04L 1/16 | (2006.01) |
| H04N 21/231 | (2011.01) |
| H04N 21/6375 | (2011.01) |
| H04N 21/6437 | (2011.01) |
| H04N 19/61 | (2014.01) |
| H04N 19/89 | (2014.01) |

(52) U.S. Cl.
CPC .............. *G08C 25/02* (2013.01); *H04L 1/1678* (2013.01); *H04N 19/61* (2014.11); *H04N 19/89* (2014.11); *H04N 21/23106* (2013.01); *H04N 21/6375* (2013.01); *H04N 21/6437* (2013.01)

(58) Field of Classification Search
CPC ..................................................... H04L 1/1809
USPC .................. 714/748, 749, 751, 763, 799, 824
See application file for complete search history.

(56) References Cited

U.S. PATENT DOCUMENTS

| 4,593,323 A | * | 6/1986 | Kanda et al. | 379/100.01 |
|---|---|---|---|---|
| 6,519,651 B1 | * | 2/2003 | Dillon | 709/250 |
| 7,337,233 B2 | * | 2/2008 | Dillon | 709/232 |

\* cited by examiner

*Primary Examiner* — Fritz Alphonse
(74) *Attorney, Agent, or Firm* — Canon USA, Inc., IP Division

(57) ABSTRACT

A video transmitting apparatus includes a providing unit configured to provide retransmission request information including information for retransmitting video information to be transmitted to a video receiving apparatus, a control unit configured to perform connection control for communication with the video receiving apparatus, a transmitting unit configured to transmit the retransmission request information provided by the providing unit and the video information to the video receiving apparatus, through communication for which connection control is performed by the control unit, a receiving unit configured to receive a retransmission request based on the retransmission request information, the retransmission request being transmitted from the video receiving apparatus, and a retransmitting unit configured to retransmit a specific part of the video information in accordance with the retransmission request received by the receiving unit.

20 Claims, 9 Drawing Sheets

FIG. 4

```
DESCRIBE rtsp: //hostname/sample. mp4 RTSP/1. 0
CSeq: 1
Accept: application/sdp
```
~401

```
RTSP/1. 0 200 OK
Cseq: 1
Content-Type: application/sdp
Content-Base: rtsp: //hostname/sample. mp4/
```
~402

```
v = 0
s = /sample. mp4
c = IN IP4 0. 0. 0. 0
m = video 0 RTP/AVP 97
a = rtpmap: 97 MP4V-ES
a = mpeg4-esid: 201
a = retransmit: http: //hostname/retransmit. cgi
```
~403

```
SETUP rtsp: //hostname/sample. mp4 RTSP/1. 0
CSeq: 2
Transport: RTP/AVP: unicast: client_port = 3002-3003
```
~404

```
RTSP/1. 0 200 OK
Cseq: 2
Session: 23456789
Transport: RTP/AVP: unicast
client_port = 3002-3003: server_port = 5000-5001
```
~405

```
PLAY rtsp: //hostname/sample.mp4 RTSP/1. 0
CSeq: 3
Session: 23456789
```
~406

```
RTSP/1. 0 200 OK
Cseq: 3
Session: 23456789
RTP-Info: url = rtsp: //hostname/sample.mp4;
seq = 13579; rtptime = 1234567
```
~407

```
TEARDOWN rtsp: //hostname/sample. mp4 RTSP/1. 0
CSeq: 4
Session: 23456789
```
~408

```
RTSP/1. 0 200 OK
Cseq: 4
Session: 23456789
```
~409

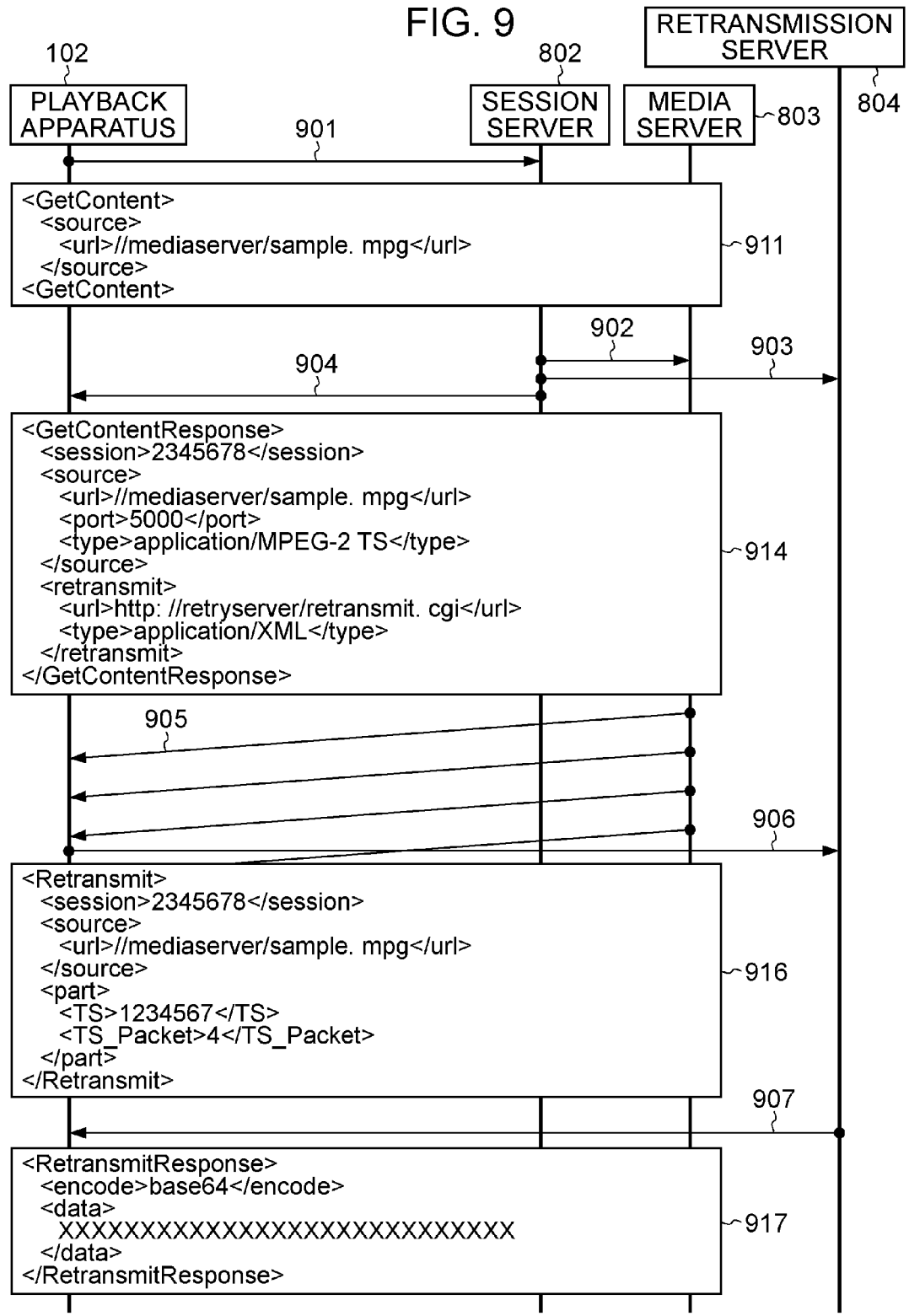

VIDEO TRANSMITTING APPARATUS, VIDEO RECEIVING APPARATUS, AND VIDEO TRANSMISSION SYSTEM

CROSS-REFERENCE TO RELATED APPLICATIONS

This application is a continuation of U.S. patent application Ser. No. 12/026,671 filed Feb. 6, 2008, which claims priority to Japanese Patent Application No. 2007-027074 filed on Feb. 6, 2007, each of which is hereby incorporated by reference herein in its entirety. U.S. patent application Ser. No. 12/026,671 has now issued as U.S. Pat. No. 8,214,708.

BACKGROUND OF THE INVENTION

1. Field of the Invention

The present invention relates to techniques for transmitting video information or the like through communication lines.

2. Description of the Related Art

With the recent development of communication systems, it has become common that live video images captured by cameras and recorded moving video images are viewed through communication lines such as the Internet. In addition, the recent price reduction of wireless communication devices and increase in the capacity of communication lines provide opportunities for viewing moving image data even in houses and offices using devices connected to networks.

Such moving image data often has a large data amount per unit time. Communication protocols such as RTP (Real-time Transport Protocol) (RFC 3550, The Internet Society) have been used to view images of moving image data having high real-time characteristics such as live video for a long time period.

In real-time communication using communication protocols such as RTP, in general, the data reliability may not be sufficient. On the other hand, lower-layer protocols such as UDP/IP, which are relatively simple and may increase communication speed, are also used. Thus, the use of UDP/IP is highly expected, if not assumed, in RTP.

Although UDP/IP or the like is suitable for real-time transmission, it has a problem of frequent occurrence of errors such as packet loss. The occurrence of an error is likely to result in loss of a part of moving image data. To address this, various techniques have been developed.

For example, there is a technique which has been implemented in which compressed (encoded) moving image data is configured so that a range of data on which an error has an effect is limited at the time of encoding. There is also a technique in which the loss of moving image data due to an error is configured to have less effect on a played back image to be displayed. In addition, from a viewpoint of communication facilities, communication lines with increased reliability have been proposed, which reduces error rates under certain conditions.

On the other hand, recovering from an error which has already occurred is also important. A typical example of techniques of error recovery is monitoring systems using live video, in which moving images captured by cameras are monitored in real time from remote locations while monitoring results are stored.

Techniques have been proposed with a view to recovering from existing errors. For example, Japanese Patent Laid-Open No. H5-145594 discloses a real-time communication apparatus in which a communication channel prepared particularly for real-time processing and a communication channel prepared for retransmission of erroneous data in case of error occurrence are selectively used.

However, such a technique using a plurality of communication lines may cause an error and a transmission delay due to an increase in the amount of data flowing over a communication line used for retransmission of data corresponding to erroneous data. To address this problem, for example, Japanese Patent Laid-Open No. H10-313350 discloses a communication system in which a plurality of channels are used and retransmission of data corresponding to erroneous data is scheduled to start after normal data transmission is completed.

In addition, Japanese Patent Laid-Open No. 2002-199019 discloses a communication control apparatus in which real-time applicability and data reliability are considered in the framework of playback application and storage application, respectively. Specifically, in this apparatus, UDP (User Datagram Protocol) prepared for playback and TCP (Transmission Control Protocol) prepared for storage are selectively used to prevent occurrence of an error. Further, Japanese Patent Laid-Open No. 2000-151680 discloses a communication apparatus in which switching of the communication protocol used for data transmission is performed when an error occurs, from UDP to TCP, which provides low real-time performance while having high data transmission reliability.

However, the techniques described above has a disadvantage in that two types of communication line, i.e., a communication line for playback which gives preference to real-time performance and thus has low data transmission reliability and a communication line for storage (communication line for retransmission for error recovery) which has low real-time performance and thus has high data transmission reliability, have to be prepared.

If these two communication lines are physically integrated into a single communication line, simultaneous use of the communication line for playback and the communication line for storage may result in an increase in communication traffic and an increase in the error rate. Thus, when an error occurs during data transmission, it is difficult for a receiving terminal to acquire data corresponding to erroneous data adaptively in accordance with the situation.

One solution to the above problem may be a method in which the two communication lines are not simultaneously used and a communication line for playback detects an error while receiving playback data. In this method, when an error is detected, a communication line for storage (erroneous data retransmission communication line) requests retransmission of data corresponding to erroneous data after the reception of the playback data is completed.

However, if this method is implemented, it is necessary to specify the erroneous part of data by strictly managing communication connections and to switch the communication line to a communication line having high data transmission reliability for retransmitting data corresponding to the erroneous data. In the case of moving image data such as live data for which real-time processing is required, it is necessary to retain the moving image data at a transmission terminal until communication is completed to prepare retransmission of data corresponding to the erroneous data. Thus, when an error is detected, it may not be possible to playback the moving image data in a receiving terminal until data corresponding to erroneous data is retransmitted, and thus real-time playback of the moving data is not permitted.

Further, when, in the case of error detection, switching of communication line from the communication line for playback with high real-time performance to the communication line for storage with high data transmission reliability is performed, it is necessary to determine the occurrence of an error in a very short time and perform switching of the communication line instantly. Thus, failure of instant error detection and switching of the communication line may result in a significant time loss due to error recovery. In addition, since a communication line with low real-time performance is used after the switching of the communication line, implementation of the above method does not provide sufficient real-time performance in data transmission.

SUMMARY OF THE INVENTION

The present invention has been made in view of the above circumstances. Accordingly, there is a need for a technique for playing back data for which real-time processing is required in real time and, when an error occurs, acquiring data corresponding to erroneous data adaptively according to the situation.

To this end, a video transmitting apparatus according to an exemplary embodiment of the present invention includes a providing unit configured to provide retransmission request information including information for retransmitting video information to be transmitted to a video receiving apparatus, a control unit configured to perform connection control for communication with the video receiving apparatus, a transmitting unit configured to transmit the retransmission request information provided by the providing unit and the video information to the video receiving apparatus, through communication for which connection control is performed by the control unit, a receiving unit configured to receive a retransmission request based on the retransmission request information, the retransmission request being transmitted from the video receiving apparatus, and a retransmitting unit configured to retransmit a specific part of the video information in accordance with the retransmission request received by the receiving unit.

According to an exemplary embodiment of the present invention, when an error occurs, a receiving terminal can acquire data corresponding to erroneous data while playing back data for which real-time processing is required in real time. Thus, it is not necessary to continuously use communication connection to be used for retransmission, permitting efficient use of communication resources. In addition, the above configuration allows the receiving terminal to determine the timing of retransmission of desired video data corresponding to a communication error, while performing video communication for which real-time processing is required.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 illustrates examples of RTP messages to be exchanged in an exemplary embodiment of the present invention.

FIG. 9 illustrates an example of data flow including message exchange for establishing a session in an exemplary embodiment of the present invention.

DESCRIPTION OF THE EMBODIMENTS

First Exemplary Embodiment

In the following, a first exemplary embodiment of the present invention will be described with reference to the drawings. In the first exemplary embodiment, a video transmitting apparatus is implemented as a network camera having communication capability and a video receiving apparatus is implemented as a playback apparatus having communication capability.

Figure 1:
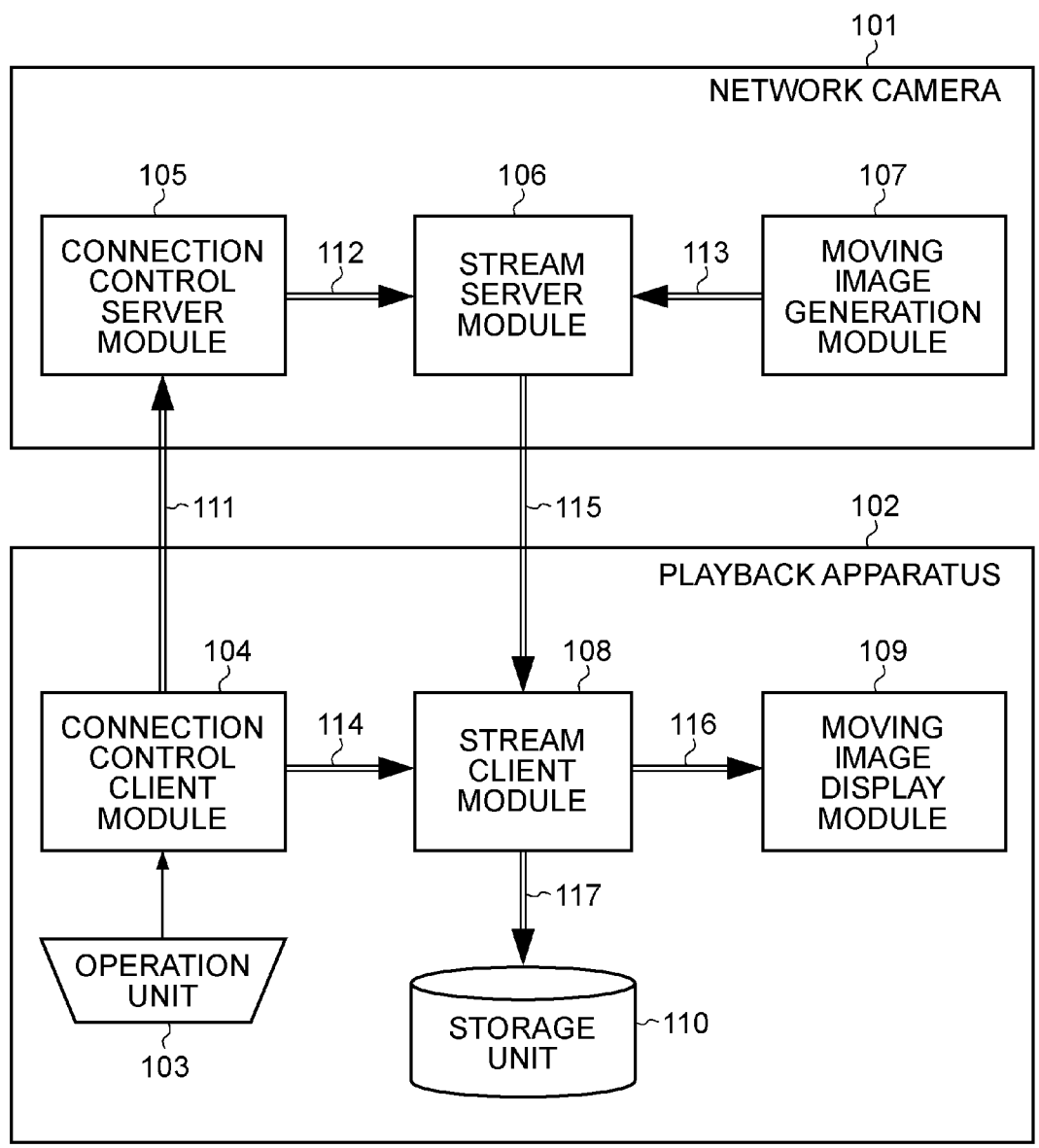
FIG. 1 is a conceptual diagram illustrating a system configuration according to an exemplary embodiment of the present invention.

FIG. 1 is a conceptual diagram illustrating a system configuration according to the present exemplary embodiment.

As illustrated in FIG. 1, this system includes a network camera 101 configured to generate moving image data and distribute the moving image data over a network such as a LAN (local area network), and a playback apparatus 102 configured to receive moving image data and display the moving image data.

The network camera 101 is an image pickup apparatus having an image pickup unit and a communication function and has been in widespread use particularly for monitoring. The network camera 101 has functional components including a connection control server module 105, a stream server module 106, and a moving image generation module 107.

The connection control server module 105 serves as a transmitting-terminal connection control unit and performs session control while communicating with the playback apparatus 102 via a communication line. This enables the stream server module 106 to send moving image data generated by the moving image generation module 107 in an appropriate format.

The playback apparatus 102 is capable of communicating with the network camera 101 and plays back a moving image. The playback apparatus 102 may be implemented as, for example, an application program running on a personal computer or as a component of a monitoring apparatus having a dedicated display. The playback apparatus 102 has functional components including a communication control client module 104, a stream client module 108, a moving image display module 109, and a storage unit 110.

The communication control client module 104 serves as a receiving-terminal connection control unit and establishes a session in response to a user operation on an operation unit 103 while communicating with the network camera 101. On the basis of connection information obtained through the communication, the stream client module 108 receives moving image data, and the moving image display module 109, which serves as a playback unit, plays back and displays the received moving image data. The storage unit 110 stores the received moving image data or the like.

Referring to FIG. 1, a processing procedure using the above system will be briefly described. When the operation unit 103 in the playback apparatus 102 is operated by a user, the playback apparatus 102 instructs the network camera 101 to acquire moving image data. The user operation may be, for example, input of the URL (Uniform Resource Locator) of the network camera 101 through a GUI (graphical user interface) or a pressing of a switch using information relating to communication connection which is predefined in the playback apparatus 102.

The instruction for acquiring an image is transmitted from the communication control client module 104 to the connection control server module 105 as a connection control message 111. Examples of communication schemes for connection control, which have been widespread use, include a Web service using SIP (Session Initiation Protocol), XML (Extensible Markup Language), or the like. One of the most common connection control schemes is RTSP (Real Time Streaming Protocol) (RFC 2326, The Internet Society). In this exemplary embodiment, connection control is performed using RTSP.

For simplicity of description, the connection control message 111 is indicated by an arrow in FIG. 1. However, in RTSP communication in general, message exchange is performed multiple times.

The connection control server module 105 sends the stream server module 106 an instruction for transmitting a data stream, as indicated by an arrow 112. In response to the instruction, the stream server module 106 acquires moving image data generated by the moving image generation module 107 as indicated by an arrow 113 and sends the moving image data to the playback apparatus 102 as indicated by an arrow 115.

On the basis of a result of control of connection with the connection control server module 105, the communication control client module 104 sends the stream client module 108 an instruction for receiving the moving image data, as indicated by an arrow 114. This allows the stream client module 108 to receive the moving image data supplied by the stream server module 106.

In RTSP, information on details of moving image data to be transmitted is contained in the connection control message 111 using SDP (Session Description Protocol) (RFC, The Internet Society). Thus, this information is used as common information between the stream server module 106 and the stream client module 108. The received moving image data can be transmitted to the moving image display module 109 as playback moving image data 116 to be displayed or stored in the storage unit 110 as storage moving image data 117.

Figure 2:
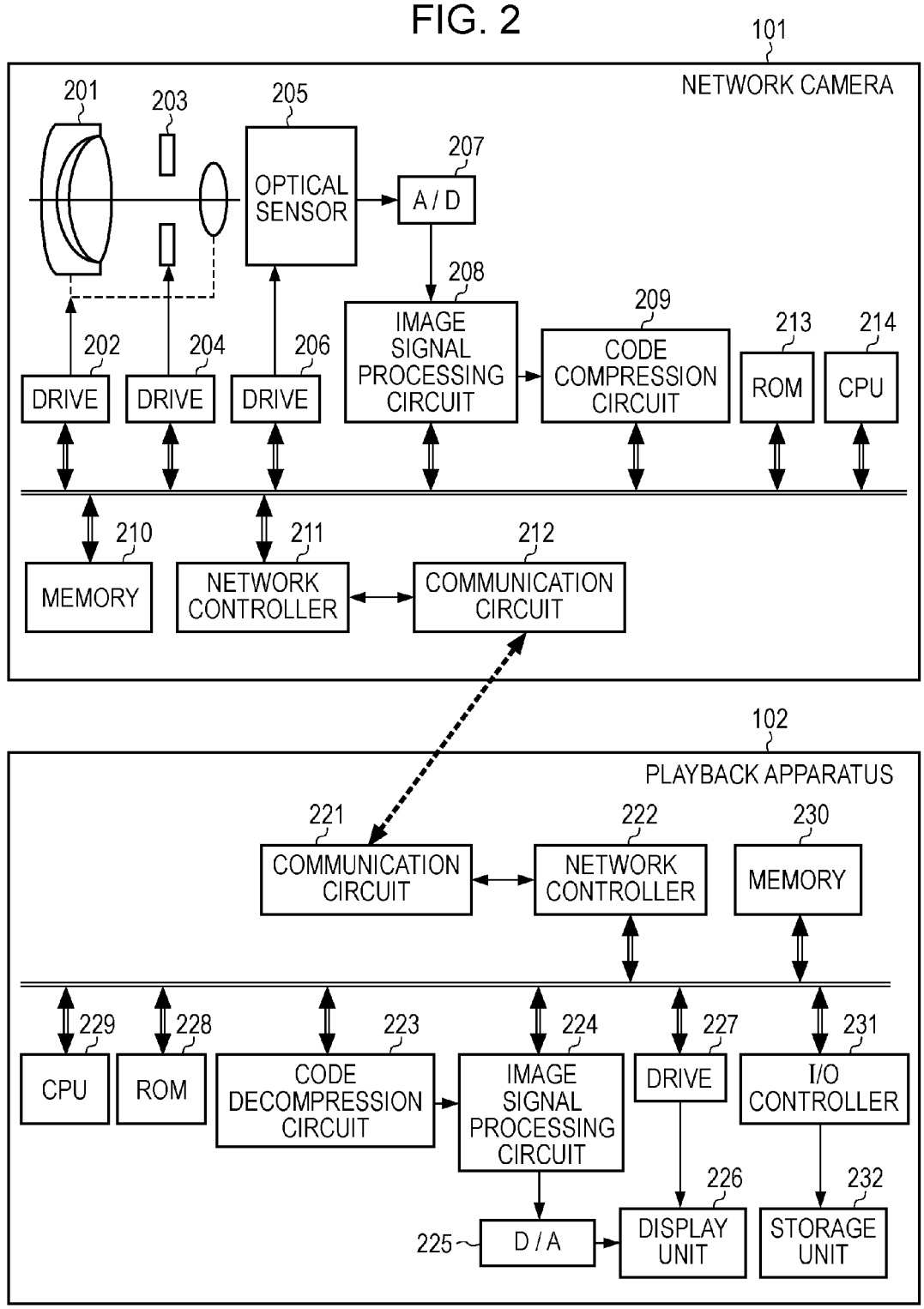
FIG. 2 is a block diagram illustrating an internal configuration of a network camera and a playback apparatus in an exemplary embodiment of the present invention.

FIG. 2 is a block diagram illustrating examples of internal configurations of the network camera 101 and the playback apparatus 102 according to the present exemplary embodiment and illustrates details of the system configuration diagram illustrated in FIG. 1. Referring to FIG. 2, a processing procedure from transmission of moving image data from the network camera 101 to the playback apparatus 102 to display of the moving image data in the playback apparatus 102 will be described.

In the network camera 101, an image of an object is formed on an optical sensor 205 via an image pickup lens unit 201 having an optical system. A lens group provided in the image pickup lens unit 201 can be moved by a motor for focusing. An image pickup lens unit drive circuit 202 directly controls the image pickup lens unit 201. At this time, an aperture unit 203 is operated by an aperture unit drive circuit 204 so that the quantity of image forming light is appropriately adjusted.

The optical sensor 205 in the network camera 101 includes a solid-state image pickup device such as a CCD (charge coupled device) and a CMOS (complementary metal-oxide semiconductor) and capable of converting incident light into electric charge in accordance with the quantity of the incident light and storing the electric charge. The electric charge is read and converted by an A/D (analog/digital) converter 207 into digital data such as uncompressed digital image data.

The optical sensor 205 is appropriately controlled by a pulse signal or the like output from an optical sensor drive circuit 206. The optical sensor 205 continuously performs an operation procedure in which the stored electric charge is read at a predetermined timing in a predetermined time period so that continuous digital image data is obtained. Such continuous digital image data is moving image data.

The digital image data is supplied to an image signal processing circuit 208 for encoding (compression). The image signal processing circuit 208 performs correction such as white balance correction and gamma correction on the digital image data and sends the corrected digital image data to a code compression circuit 209. This transmission/reception of digital images data to/from the components is realized, for example, by high-speed access to a memory 210 using a DMA a (direct memory access) circuit, enabling processing of a large amount of data in real time.

The code compression circuit 209 implements encoding algorithm for compressing moving image data. For example, in the case of so-called motion JPEG (Joint Photographic Expert Group) (ISO/IEC 10918) image data obtained by sequential JPEG encoding, when a digital image input from the image signal processing circuit 208 is expressed by RGB (red, green, and blue) signals, the digital image is converted into YC signals composed of a luminance signal (Y) and chroma signals (Cb/Cr). The converted image signals are then divided into, for example, 8×8 pixel blocks and undergo processing such as DCT (discrete cosine transform), quantization, and Huffman coding. As a result, compressed image data is generated and output.

If a compression scheme such as MPEG-2 (ISO/IEC 13818) and MPEG-4 (ISO/IEC 14496), in which inter-frame prediction is performed, is employed, frames immediately preceding and following a reference frame (single image data) to be compressed are referred to. Then, processing such as motion compensation and macro blocking is performed on the frames, and as a result compressed moving image data (bit stream), in which adjacent frames are dependent upon each other, is generated and output.

The compressed moving image data is temporarily stored in the memory 210. The compressed image data is converted into a format suitable for communication and output from a communication circuit 212 to a communication path via a network controller 211.

A CPU (Central Processing Unit) 214 in the network camera 101 controls the series of operations described above in real time and optimizes processing of each block. Specifically, the CPU 214 executes operations in accordance with a so-called control program (firmware). The control program is normally stored in a ROM (read only memory) 213 as static information.

The network camera 101 reads the control program (firmware) from the ROM 213 at the time of activation as necessary and executes the control program using CPU 214 so as to operate the entire components of the camera. The control program (firmware) to be executed by the CPU 214 has several functions. For example, the control program instructs operations of the image pickup lens unit 201 described above, such as a zoom operation (adjustment of the focal length) and an auto-focus operation.

In the playback apparatus 102, the compressed moving image data which has been transmitted through the communication path is received by a network controller 222 via a communication circuit 221. The network controller 222 converts the compressed moving image data from a format suitable for transmission through the communication path to a format suitable for use in the playback apparatus 102. Then, the compressed moving image data is temporality stored in a memory 230. As illustrated in FIG. 2, control of the above operations and other various operations on the playback apparatus 102 are performed similarly to the case of the network camera 101 by an operation mechanism constituted by a CPU 229, a ROM 228, or the like.

A code decompression circuit 223 in the playback apparatus 102 corresponds to the code compression circuit 209 in the network camera 101. The code decompression circuit 223 decompresses the compressed image data temporarily stored in the memory 230. In an image signal processing circuit 224, the decompressed image data is subject to edge smoothing processing, for example, so as to be converted into moving image data suitable for display. The image data is transferred to a display unit 226 which is driven by a drive circuit 227 via a D/A converter 225 if the display unit 226 has an analog interface. Through the above procedure, the playback apparatus 102 can receive moving image data from the network camera 101 and display the moving image data on the display unit 226.

In the playback apparatus 102, moving image data transmitted from the network camera 101 is converted into a recording file format by a control program executed by the CPU 229. The converted moving image data is then output to a storage unit 232, such as a memory card and a hard disk, via an I/O controller 231. The storage unit 232 is compatible with recording media including built-in flash memories, recording optical disks such as CD-Rs and DVD-Rs, and magneto-optical disks.

When audio is necessary, a microphone, for example, can be implemented similarly to the optical sensor 205, although not shown in FIG. 2. Audio processed through the microphone is converted into a digital data by an A/D converter, and the digital audio data is compressed (encoded) through an audio signal processing circuit and an audio compression circuit. This arrangement allows audio data to be processed on the network camera 101 similarly to moving image data. In this case, the playback apparatus 102 can be provided with audio components such as an audio decompression circuit, an audio signal processing circuit, a D/A converter, and a speaker.

In the foregoing, a processing procedure from transmission of moving image data from the network camera 101 to the playback apparatus 102 to display of the moving image data on the display unit 226 in the playback apparatus 102 has been described in detail. However, for example, it is also possible that compression of moving image data performed by the code compression circuit 209 described above be performed by firmware in the CPU 214. In addition, the conversion into a recording file format described above may also be performed by hardware.

The exchange of the message 111 described above is controlled by the control program executed by the CPU 229 so that the playback apparatus 102 sends the message 111 to the network camera 101 via the network controller 222 to enable the exchange. This will be described in more detail below.

Figure 3:
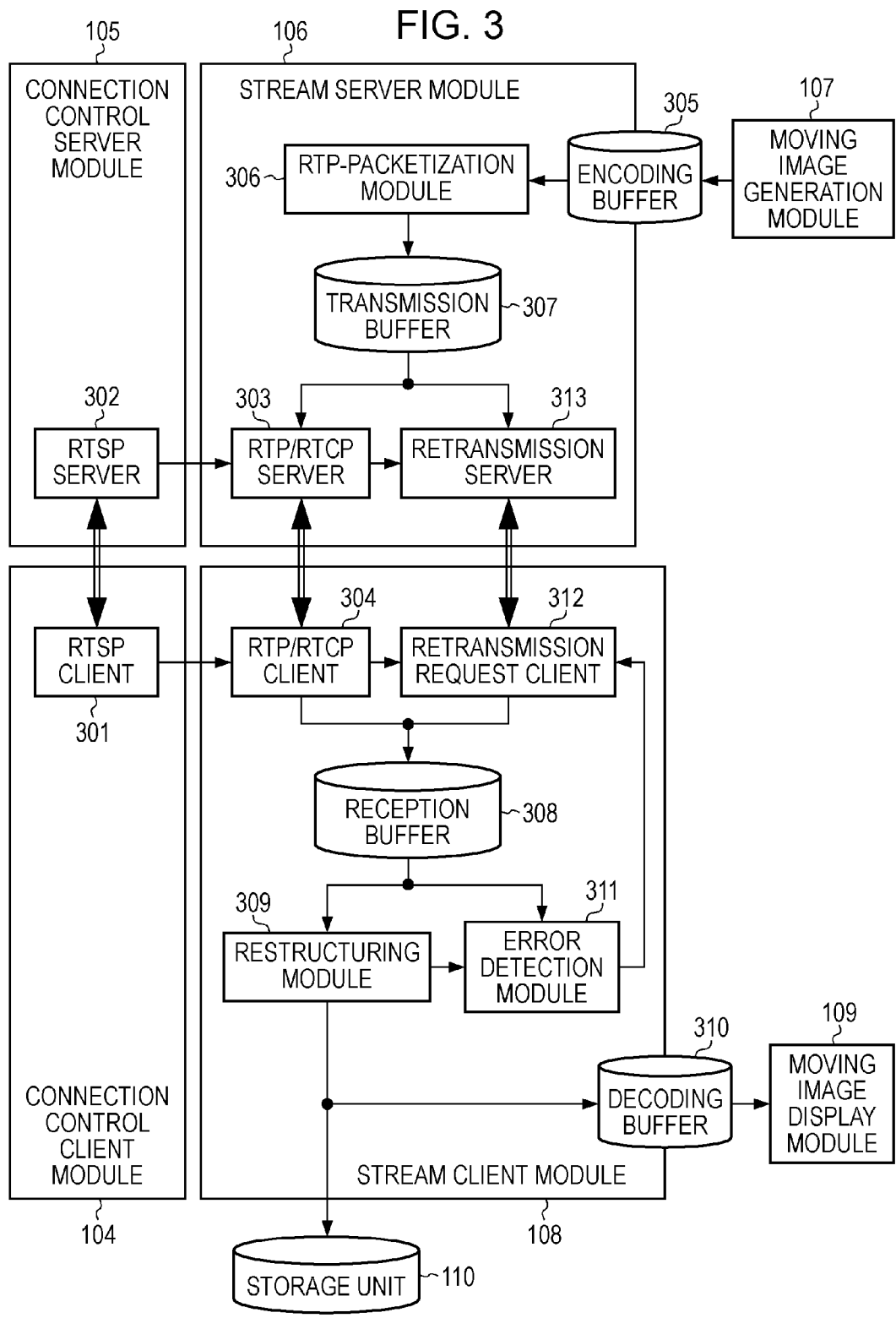
FIG. 3 is a block diagram illustrating a system configuration in which RTSP and RTP are applied in transmission of moving image data, in an exemplary embodiment of the present invention.

FIG. 3 is a block diagram illustrating a system configuration in which RTSP and RTP (Real-time Transport Protocol) (RFC 3550, The Internet Society) are used in transmission of moving image data. In the following, the exchange of the connection control message 111 and the transmission of moving image data (indicated by the arrow 115 in FIG. 1) described using FIG. 1 will be described in more detail. In the following description, the message exchange and the data transmission are performed using, for example, RTP which is commonly used in conjunction with RTSP. For simplicity of description using FIG. 3, examples of messages to be exchanged using RTSP are illustrated in FIG. 4.

As illustrated in FIG. 3, the communication control client module 104 and the connection control server module 105 include an RTSP client 301 and an RTSP server 302, respectively.

RTSP does not specifically define a lower layer communication protocol. However, to realize its function, RTSP uses TCP/IP ensuring high transmission reliability. Although a general procedure of connection control is defined in RTSP, the details of the procedure of connection control can be flexibly changed. Thus, the following description is provided along with the most general connection control procedure.

As described above, the network camera 101 sends an instruction for acquiring image data in response to a user operation on the operation unit 103 in the playback apparatus 102. In this instruction, the RTSP client 301 requests the RTSP server 302 to acquire a remote resource specified by a URL. That is, an RTSP DESCRIBE method is transmitted by the RTSP client 301.

In response to the RTSP DESCRIBE method, the RTSP server 302 returns session information based on SDP to the RTSP client 301. SDP can be extended as necessary. In addition, SDP includes requisite information items such as version information and a session ID as well as MIME type of media (m) and attribute specific the media (a), while also including many optional information items. Specifically, in the case of video data of a moving image, the RTSP client 301 functions as a video information receiving unit which can acquire detailed information on the video data as follows.

m=video 0 RTP/AVP 97
a=rtpmap:97 MP4V-ES/90000

The RTSP server 302 serving as a retransmission-request connection information providing unit retains such detailed information as information constituting the system. The RTSP server 302 can also function as a video information transmitting unit to send the detailed information. It is also possible that the stream server module 106 serving as a retransmission-request connection information providing unit acquires the detailed information, and the RTSP server 302 serving as the video information transmitting unit transmits the detailed information.

FIG. 4 illustrates messages to be exchanged between the network camera 101 and playback apparatus 102, including a DESCRIBE method 401, a response 402 to the DESCRIBE method 401, and an SDP message 403 included in the response 402. As illustrated in FIG. 4, the last row of the SDP message 403 is "a=retransmit:http://hostname/retransmit.cgi". The last row is an extension of commonly used RTSP and SDP and indicates a URL as the destination of a retransmission request, which will be described below.

The RTSP client 301 sends a SETUP method 404 to the RTSP server 302 and the RTSP server 302 returns a response 405 to the RTSP client 301. Through the exchange of these messages, the RTSP client 301 requests the RTSP server 302 to prepare for media transmission. As a result, both the RTSP client 301 and the RTSP server 302 recognize a communication port or the like for media transmission, enabling transmission of specific moving image data.

At this time, the RTSP server 302 notifies an RTP/RTCP server 303 of a specific address and a port number for transmitting the moving image data. Similarly, the RTSP client 301 notifies an RTP/RTCP client 304 of a specific address or port number for transmitting the moving image data. This procedure enables transmission of specific moving image data.

The actual transmission of moving image data is started by a PLAY method 406 and a response 407 to the PLAY method 406. Specifically, the RTSP client 301 sends the RTSP server 302 the PLAY method 406, and then the RTSP server 302 instructs the RTP/RTCP server 303 to initiate transmission of moving image data. At the same time, the RTSP server 302 returns basic information on the RTP timestamp of the moving image data supplied by the RTP/RTCP server 303, to the RTSP client 301. Then, the RTSP client 301 sends the RTP/RTCP client 304 the basic information on the RTP timestamp, such that the RTP/RTCP client 304 starts data reception.

In the following, the flow of RTP packets will be described. Before the description, a TEARDOWN method 408 and a response 409 to the TEARDOWN method 408 illustrated in FIG. 4 will be briefly described. The TEARDOWN method 408 is a message for notifying the termination of a session and is used for normal termination of a session between the RTSP client 301 and the RTSP server 302. For example, this message allows the RTSP server 302 to request the RTP/RTCP server 303 to stop transmitting moving image data.

Now, a transmission mechanism in which moving image data is transmitted from the RTP/RTCP server 303 to the RTP/RTCP client 304 using the PLAY method 406 will be described. The transmission of moving image data from the RTP/RTCP server 303 which functions as a video information transmitting unit to the RTP/RTCP client 304 which functions as a video information receiving unit is performed in accordance with RTP.

In RTP, data to be transmitted (encoded moving image data, in this case) is divided into the smallest units of data on a communication path, each of which is provided with additional information called an RTP header. Each of the data units is called an RTP packet. To obtain RTP packets, moving image data generated by the moving image generation module 107 is temporarily stored in an encoding buffer 305, which functions as a video information storing unit. Then, the moving image data stored in the encoding buffer 305 is RTP-packetized by an RTP-packetization module 306 and temporarily stored in a transmission buffer 307. The stored RTP-packets are transmitted from the RTP/RTCP server 303.

The encoding buffer 305 and the transmission buffer 307 may be memories or recording media such as hard disks. In this case, a memory such as the memory 210 illustrated in FIG. 2 is used since high-speed processing is usually required. The RTP/RTCP client 304 receives the RTP packets transmitted by the RTP/RTCP server 303 and sequentially stores the received RTP packets in a reception buffer 308.

Note that the RTP packets are not received in the order in which they were transmitted and are separated from each other. Thus, to decode the moving image data, it is necessary to restructure the separated packets into the original encoded data. This data restructuring is performed by a restructuring module 309. When there is no error in the received data, the restructuring module 309 stores the restructured encoded data in a decoding buffer 310, so that moving image display module 109 can decode and playback the encoded data.

Figure 5:
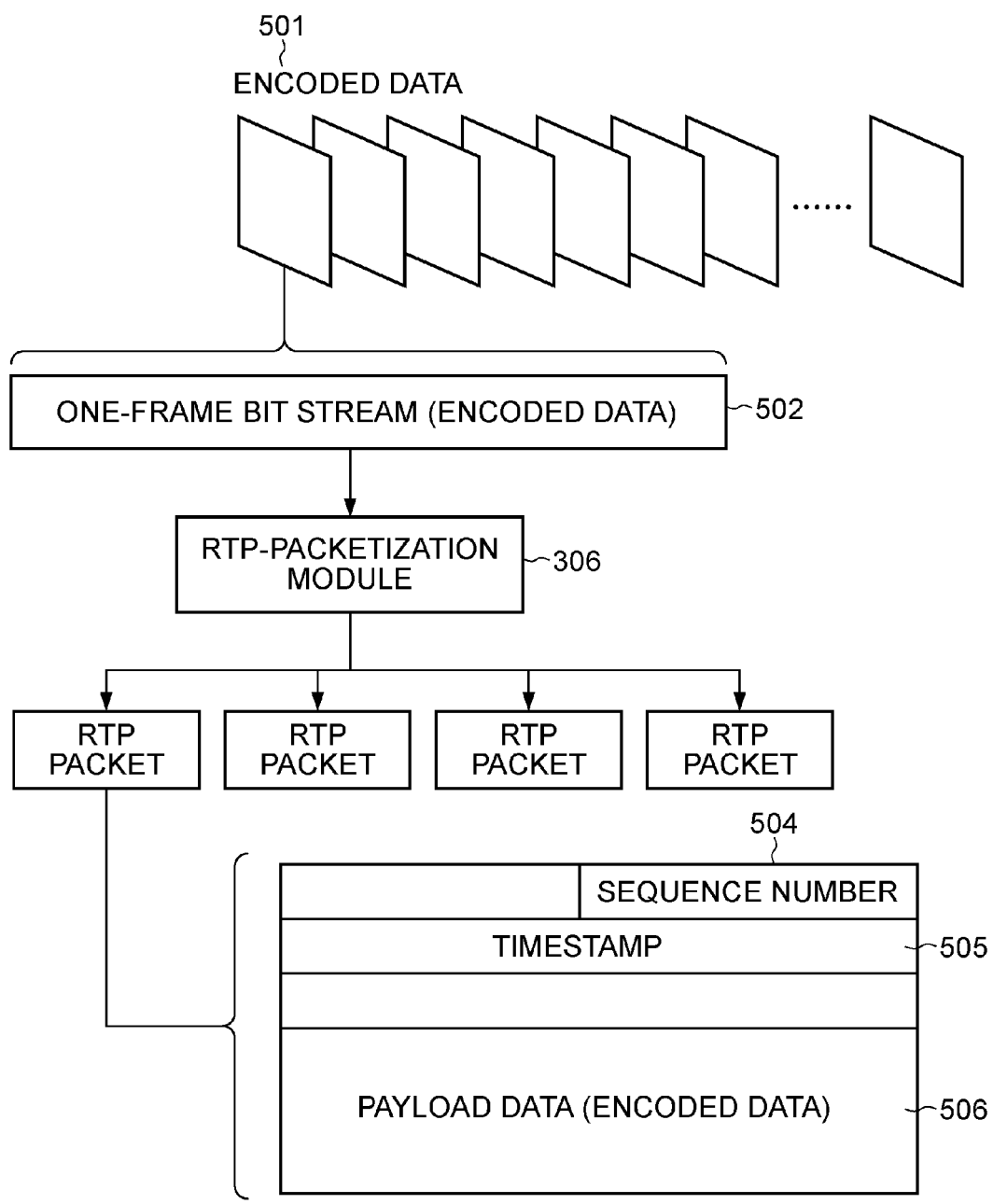
FIG. 5 schematically illustrates an RTP packet.

For clarity of description, generation of RTP packets is schematically illustrated in FIG. 5.

As illustrated in FIG. 5, encoded data 501 of a moving image is generated as a binary stream representing a sequence of frames (pictures). This binary stream is called a bitstream 502. The RTP-packetization module 306 divides this bitstream 502 into appropriate transmission units. In RTP, such an appropriate transmission units is expressed as an RTP packet.

When the RTP-packetization module 306 divides the bitstream 502, the bitstream 502, which forms a sequence of data stream, is divided into fragments. Thus, additional information indicative of the order of data elements in the bitstream 502 is necessary. One characteristic of RTP packets is each RTP packet is provided with such additional information. FIG. 5 illustrates examples of typical additional information, including a sequence number 504 representing the order of packets, a timestamp 505 indicating a frame time, and a payload data 506 corresponding to the divided bitstream.

Although not shown in FIG. 5, an RTP packet includes other information such as information indicative of the end of RTP packets constituting a frame and version information in corresponding RTP packet specifications.

In the foregoing, the case in which the received data contains no error has been described. However, RTP packets are transmitted using RTP which is implemented on UDP whose reliability in terms of real-time performance and transmission speed is not sufficient. Therefore, a failure such as packet loss may occur during RTP transmission due to external factors such as nose, resulting in an error such as incomplete decoding. Thus, the restructuring module 309 performs error detection in cooperation with an error detection module 311 which functions as an error detecting unit.

When an error is detected, a retransmission request client 312 is instructed to request retransmission of a packet corresponding to a packet in which an error is detected (erroneous packet). The retransmission request client 312 functions as a retransmission requesting unit and performs communication for requesting a retransmission server 313 for retransmission. At this time, the resource of the retransmission server 313 serving as a retransmission request receiving unit, (i.e., a URL for the retransmission request indicating the storage destination of video information) is contained in the SDP message 403, as described above. The URL for the retransmission request may be notified via the RTSP client 301 or acquired via the RTP/RTCP client 304 together with other SDP information. FIG. 3 illustrates the case in which the URL for the retransmission request is transmitted via the RTP/RTCP client 304.

The retransmission server 313 functions as a video information retransmitting unit and acquires a packet corresponding to an erroneous packet from the transmission buffer 307 in accordance with the retransmission request transmitted from the retransmission request client 312. Then, the retransmission server 313 supplies the packet corresponding to the erroneous packet to the retransmission request client 312 serving as a retransmitted video information receiving unit. With this processing, the packet corresponding to the erroneous packet is acquired and stored in the reception buffer 308 again, so that the moving image data is recovered from the error.

While RTP packets have been described above, in RTP, RTCP (Real-time Control Protocol) packets, which are closely associated with RTP packets, are also used. Since RTCP packets are standardized, the detailed description thereof will be omitted. RTCP packets are used so that the RTP/RTCP server 303 and the RTP/RTCP client 304 can exchange statistical information relating to transmission state or reception state of RTP packets.

In general, unlike RTP packets, which are transmitted in real time, RTCP packets are implemented so as to be transmitted/received every five seconds as statistical summary information. The RTCP packets allow the RTP/RTCP server 303 to recognize an error rate of transmitted RTP packets upon reception and a reception time. In addition, the transmission/reception of RTCP packets allows the RTP/RTCP server 303 to recognize a timing at which the amount of communication traffic is reduced.

Now, a more specific example of a URL for a retransmission request contained in the SDP message 403 will be described, using an example of a URL for a retransmission request illustrated in FIG. 4. One example of a URL for a retransmission request may be as follows. "http://hostname/retransmit.cgi?ses=23456789&seq=24680"

This URL includes the URL contained in the SDP message 403 and a parameter of the URL. The first parameter indicated as "ses=23456789" refers to a session ID specified in the response to the SETUP method 404 or the like during the RTSP message exchange described above. This session ID allows the retransmission server 313 to determine the session from which the retransmission request is oriented.

The second parameter indicated as "seq=24680" refers to a sequence number 504 which represents the relative location of a specified packet in a stream of RTP packets. This sequence number 504 allows the retransmission server 313 to determine the packet corresponding to the received retransmission request.

In this example, the retransmission request client 312 can notify the retransmission server 313 of a specific packet in a specific session which is associated with an error detected by the error detection module 311. This notification can be securely transmitted using HTTP.

According to the present exemplary embodiment, it is possible to request a necessary packet at any timing convenient for the stream client module 108. That is, real-time processing is given preference in display of received moving image data. In addition, when recording of error-free data is performed at the same time, a retransmission request is sent when communication traffic is relatively small while display of the moving image data by the moving image display module 109 is continued regardless of the presence or absence of an error. During this operation, erroneous part of the moving image data can be sequentially updated and stored.

Another example of a URL for a retransmission request is shown below. "http://hostname/retransmit.cgi?ses=23456789&ts=1234900"

In this example, while the URL contains the same first parameter as the example described above, its second parameter is indicated as "ts=1234900", which represents the timestamp 505 of a frame for which the retransmission is requested. This timestamp 505 allows the retransmission server 313 to determine the timestamp corresponding to the retransmission request.

It is also possible to specify a single packet by including a third parameter in the URL which indicates the order of packets from the first to the last packets. However, in this example, the timestamp 505 is specified instead of a single packet, so that an entire frame corresponding to the specified timestamp 505 is acquired.

Each of the above examples of URLs has a session ID as a parameter. The following is an example of a URL which does not contain a session ID. "http://hostname/retransmit.cgi?rtpmap=97&&seq=24680"

In this URL, the first parameter is rtpmap information contained in the SDP message 403. Since rtpmap information maybe reused, RTP transmission may not be uniquely identified. However, in both RTP transmission and HTTP transmission, it is possible to identify the stream client module 108 by an IP address. Therefore, when the stream client module 108 performs only RTP transmission using the corresponding IP address, the retransmission server 313 can determine the packet of which retransmission is requested, on the basis of the rtpmap information and the sequence number 504 of the second parameter.

As illustrated above, it is possible to specify a part of moving image data in which an error is detected by describing a parameter indicating data to be retransmitted in an URL for a retransmission request, so that retransmission of data corresponding to the error is requested. Such a URL for a retransmission request is not necessarily obtained from the SDP message 403.

The SDP message 403 is a part of information constituting the response 402 to the DESCRIBE method 401 in RTSP. Even if the SDP message 403 is contained in the response 405 to the SETUP method 404 as a part of RTSP protocol, for example, the processing can be performed similarly to the case described above. In this case, for example, the following description may be contained in the response 405 to the SETUP method 404. "retransmit: url=http://hostname/retransmit.cgi"

Figure 6:
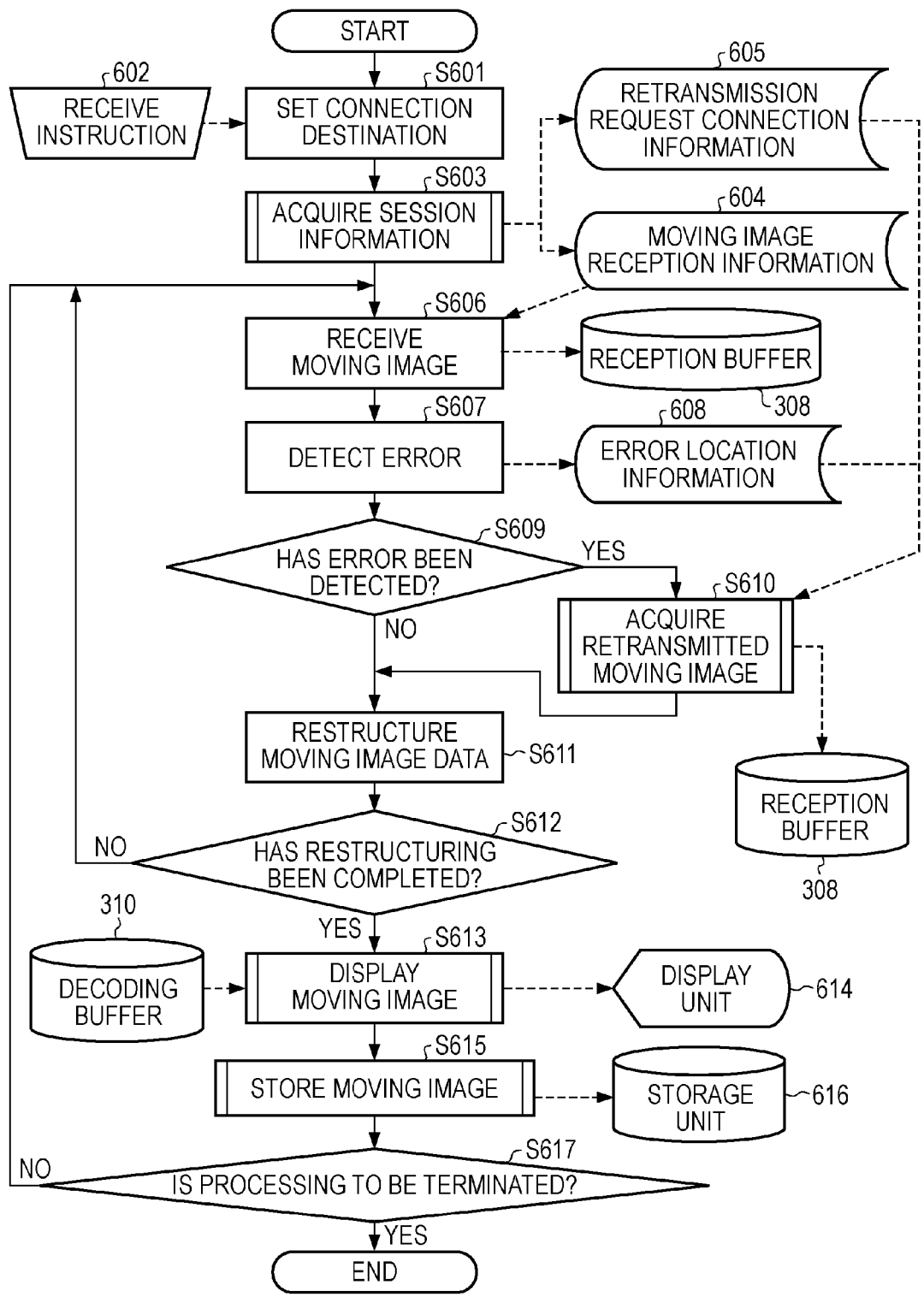
FIG. 6 is a flowchart illustrating a processing procedure performed in the playback apparatus according to an exemplary embodiment of the present invention.

In the foregoing, the detailed description of processing has been made primarily with reference to the system configuration diagram in FIG. 3. To provide clearer description, a procedure of the above-described processing will be described with reference to FIG. 6. FIG. 6 is a flowchart illustrating an example of a processing procedure performed by the playback apparatus 102 composed of the communication control client module 104, the stream client module 108, and so forth.

When the processing procedure is initiated, at Step S601, the playback apparatus 102 sets the network camera 101, which is a terminal for transmitting moving image data (more specifically, the connection control server module 105) as the connection destination. This setting may be performed through an operation terminal transmitting a receive instruction 602. It is also possible to use preset information for the setting. In this flowchart, the setting is assumed to be performed through the operation terminal. In this case, a user performs the setting by operating the operation unit 103 illustrated in FIG. 1.

After the setting of the specific connection destination, actual communication is initiated. At Step S603, session information is obtained. The details of this processing are described above using the example of RTSP message exchange in FIG. 4. As a result of the acquisition of the session information, moving image reception information 604 and retransmission request connection information 605 are acquired.

The moving image reception information 604 may be, for example, payload information in RTP, a connection port number, or the like. The description of specific information in the moving image reception information 604 will be omitted. The retransmission request connection information 605 may be, for example, a URL for a retransmission request described above, which is used for connection to the retransmission server 313.

At Step S606, moving image data is received on the basis of the moving image reception information 604. The received moving image data is stored in the reception buffer 308. Note that the received moving image data corresponds to RTP packets described above.

In this exemplary embodiment, taking into account the balance between the processing load required for the data reception and processing load required for other processing, the processing of Step S606 may be performed asynchronously and in parallel with the main processing procedure of the flowchart in FIG. 6. In this case, the playback apparatus 102 can process moving image data via the reception buffer 308 as necessary to achieve the same operation result. In this example, the description is continued assuming that the processing cost is negligible.

At Step S607, error detection is performed so that it is determined whether there is an error in the received moving image data. This processing includes, for example, checking of bit loss using a check sum for error detection and checking of packet loss through verification of the sequence number 504 of the RTP packets. An error detected in this processing is stored as error location information 608 in the form of information such as the sequence number 504 of the RTP packets.

At Step S609, it is determined whether an error has been detected as a result of the error detection. If it is determined that no error has been detected, the processing procedure proceeds to Step S611. On the other hand, if it is determined in Step S609 that an error is detected, the playback apparatus 102 performs retransmitted moving image acquisition processing at Step S610.

Information used in this processing includes the retransmission request connection information 605 acquired in the processing of Step S603 and the error location information 608. These pieces of information allow the playback apparatus 102 to acquire desired moving image data from the retransmission server 313 and store the received moving image data in the reception buffer 308. Note that such processing for which processing load is likely to increase may be performed asynchronously while the processing cost is negligible as mentioned above.

At Step S611, restructuring of the received moving image data is performed, so that the received moving image data is converted from a format optimized for transmission over a communication path into a format suitable for use as a moving image. The moving image data which has been optimized for the communication path should be restructured sufficiently to have a format that permits processing of moving image data as a moving image. Thus, at Step S612, it is determined whether the restructuring of the moving image data has been completed.

If it is determined that the restructuring has not been completed, the processing procedure returns to Step S606 so that moving image data is continuously received. On the other hand, if it is determined in Step S612 that the restructuring of the moving image data has been completed, the restructured moving image data is temporarily stored in, for example, the decoding buffer 310. Then, at Step S613, the moving image data is displayed on a display unit 614.

At Step S615, the restructured moving image data is stored in a storage unit 616. Then, at Step S617, it is determined whether the processing of the restructured moving image data is to be terminated. If it is determined that the processing is not to be terminated, the processing procedure returns to Step S606. Since a moving image is continuous in time, the processing procedure returns to Step S606 if a subsequent frame is necessary. On the other hand, if it is determined in Step S617 that the processing of the restructured moving image data is to be terminated, the processing procedure is terminated.

For clarity of description, the flowchart in FIG. 6 indicates that the processing of Step S613 and Step S615 are performed consecutively. However, depending on the system to which the present invention is applied, both the processing may not be necessary in the same processing procedure.

For example, in the processing of Step S610 the processing of acquisition of retransmitted moving image is enabled or requested as processing to be performed asynchronously with respect to the main processing procedure of the flowchart in FIG. 6, whereas the processing of Step S613 is performed only in real time. In addition, the processing of Step S615 may be performed after retransmission of moving image data is completed. This permits real-time display of a moving image on the display unit 614 regardless of the presence or absence of an error in the moving image. In addition, it is possible to store moving image data in the storage unit 616 as error-free moving image data if some delay is permitted.

When the moving image data containing an error is displayed on the display unit 614, disturbance of a portion of an image corresponding to the error may occur. However, display of moving image data containing an error is common and effective when preference is given to real-time performance of moving images to be displayed on the display unit 614.

According to this exemplary embodiment, the necessity and timing of retransmission can be determined by a receiving terminal by notifying the receiving terminal of a URL for retransmission together with session information. This arrangement is especially effective when importance is placed on both display with real-time performance and data consistency.

In the following, a transmission terminal of moving image data, i.e., the transmission buffer 307 for storing moving image data which is implemented in the network camera 101 according to the present exemplary embodiment will be described. When transmission of moving image data is performed, in general, the moving image data is encoded on a frame-by-frame (picture) basis of a frame sequence-by-frame sequence basis. Thus, when transmission fluctuation or the like is taken into account, it is necessary to reserve a predetermined amount of area in the transmission buffer 307. When retransmission control is attempted particularly taking into account an error during transmission, as in the case described above, an amount of buffer space sufficient for retransmission is necessary.

Figure 7:
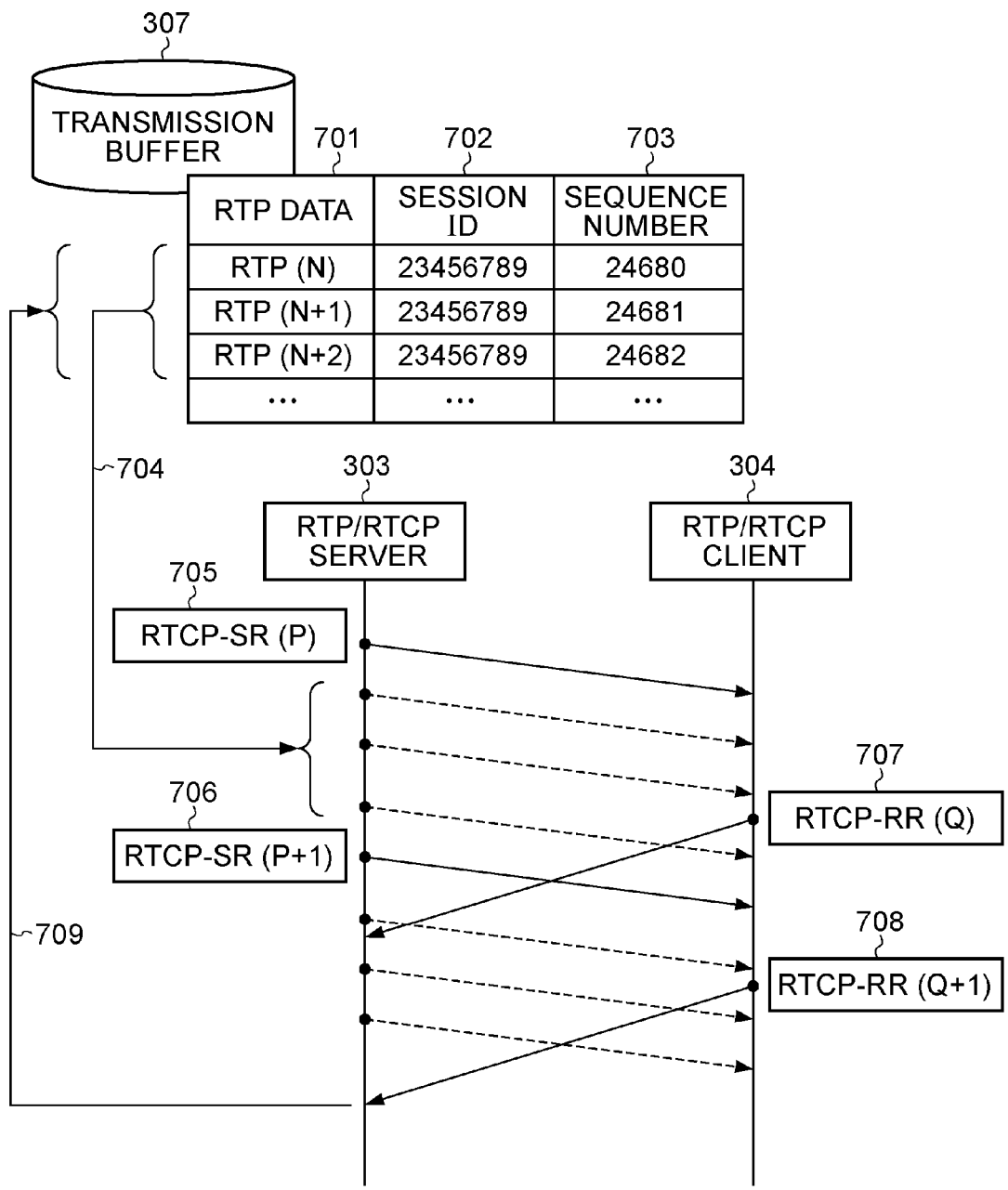
FIG. 7 illustrates an example of buffer processing according to an exemplary embodiment of the present invention.

FIG. 7 illustrates buffer processing according to an exemplary embodiment of the present invention.

In the example of FIG. 7, the transmission buffer 307 stores RTP data 701 which is actual data to be transmitted, a session ID 702 for identify the RTP data 701, and a sequence number 703.

The sequence number 703 is set in view of an increase in the processing speed and has the same value as the sequence number 504 contained in each RTP packet illustrated in FIG. 5. This enables the retransmission server 313 to perform retransmission in response to a retransmission request from retransmission request client 312 which uses a sequence number, by referring to the transmission buffer 307.

Data transmission and reception to and from the RTP/RTCP server 303 and the RTP/RTCP client 304 are illustrated in a time sequence in the lower part of FIG. 7. Each vertical line in the figure represents time flowing from the top to the bottom of the line. As illustrated in FIG. 7, the RTP data 701 temporarily stored in the transmission buffer 307 is sequentially transmitted from the RTP/RTCP server 303 to the RTP/RTCP client 304. To aid in understanding of the interaction, this transmission processing is represented by an arrow 704 in FIG. 7.

As described above, in RTP, RTCP packets containing statistical information on a transmission/reception state are also exchanged. In FIG. 7, such RTCP packets are illustrated as RTCP-SR(P) 705, RTCP-SR(P+1) 706, RTCP-RR(Q) 707, and RTCP-RR(Q+1) 708. "SR" in the RTCP-SR(P) 705 indicates an RTCP sender report, and "RR" in RTCP-RR(Q) 707 indicates an RTCP receiver report. "(P)" and "(P+1)" is used to indicate the packet sequence in which the RTCP-SR(P) 705 is the Pth packet and the RTCP-SR(P+1) 706 is the (P+1)th packet. "(Q)" and "(Q+1)" are similarly used to indicate the packet sequence.

The RTCP receiver report is standardized to include the packet discard rate of RTCP packets in a reporting time period. This allows the RTP/RTCP server 303 to determine whether an error has occurred in the RTCP packets by checking the packet discard rate. In addition, the receiver report may contain an error rate including a bit error as extension information so that RTP/RTCP server 303 recognizes an error rate not in units of packets but in units of bits.

When the packet discard rate is "0" or the error rate, if included in the receiver report, is "0", a part of data corresponding to the reporting time period can be deleted from the transmission buffer 307. This indicates that the error detection module 311 has not detected an error during the reporting time period, and thus the corresponding data can be deleted since no retransmission request is generated. This processing of deleting the corresponding data from the transmission buffer 307 is indicated by an arrow 709 in FIG. 7.

When a communication procedure employed in retransmission of data between the retransmission request client 312 and the retransmission server 313 is sufficiently reliable, retransmitted moving image data can be deleted from the transmission buffer 307. In general, moving image data has a large data size. Thus, when it is determined that there is no error according to the RTCP receiver report packets or when retransmission is completed, corresponding data is deleted from the transmission buffer 307. This permits size reduction of the transmission buffer 307.

Second Exemplary Embodiment

Figure 8:
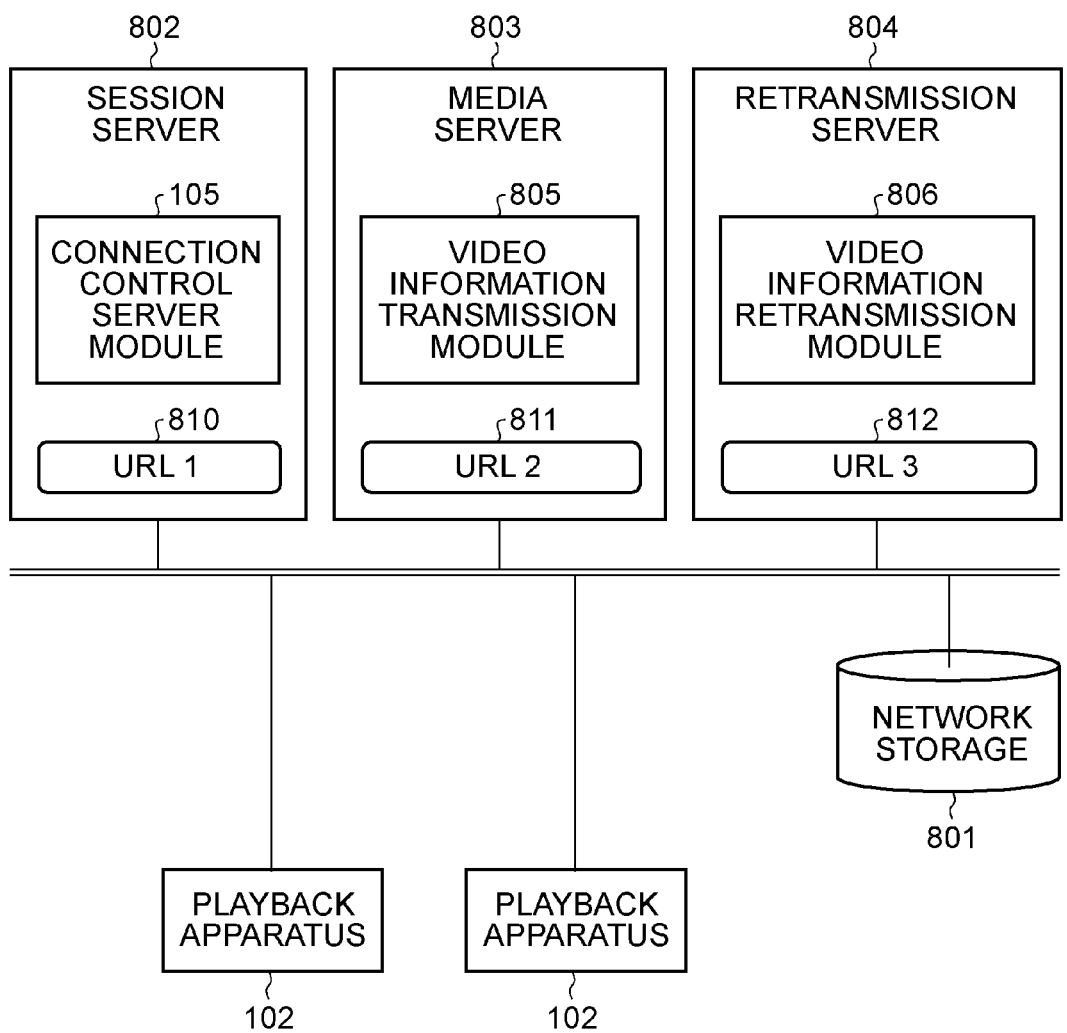
FIG. 8 illustrates an example of a network configuration according to an exemplary embodiment of the present invention.

In the following, a case in which embodiments of the present invention is applied to a video-on-demand system, which is a demand-oriented video server system, will be described. FIG. 8 illustrates logical connections in a network configuration according to the second exemplary embodiment. A video transmission system according to the present exemplary embodiment includes a network storage 801, a session server 802 for managing a request for acquiring video data, a media server 803 for distributing video data, a retransmission server 804 for managing communication error status and performing retransmission in accordance with a request, and playback apparatuses 102 for requesting video data.

Although two playback apparatuses 102 are shown in FIG. 8, the number of playback apparatus 102 to be implemented in this system is not necessarily two, and one or more than two playback apparatuses 102 may be applied. The configuration of each of the playback apparatuses 102 is similar to the playback apparatus 102 illustrated in FIG. 1, and thus the same reference numeral is used.

The session server 802 include a connection control server module 105 similar to the connection control server module 105 described in the first exemplary embodiment. However, the connection control server module 105 of this exemplary embodiment does not have a function of transmitting video data to the session server 802. Specifically, the media server 803 has the video information transmission function described in the first exemplary embodiment, and the retransmission server 804 has the video information retransmission function described in the first exemplary embodiment.

The moving image generation module 107 described in the first exemplary embodiment is not included in this system, and moving image data, i.e., video data, which has already been generated is stored in the network storage 801. The basic structure of the system in this exemplary embodiment is similar to that of the system in the first exemplary embodiment. However, in this exemplary embodiment, the network camera 101 according to the first exemplary embodiment is configured as a group of servers which are independent of each other. Thus, only components or configurations specific to this exemplary embodiment will be described.

Referring to FIG. 8, the media server 803 includes a video information transmission module 805. This video information transmission module 805 corresponds to the RTP/RTCP server 303 illustrated in FIG. 3 and exclusively serves to transmit video information specified in an instruction provided by the connection control server module 105.

Specifically, the connection control server module 105 and the video information transmission module 805 exchange signals in inter-process communication on the basis of operation processes performed in each of the modules 105 and 805. The connection control server module 105 instructs the video information transmission module 805 to send the playback apparatus 102 video data or the like stored in the network storage 801. In response to the instruction, the video information transmission module 805 transmits instructed video data to the playback apparatus 102 in an appropriate format.

The retransmission server 804 includes a video information retransmission module 806. This video information retransmission module 806 corresponds to the retransmission server 313 illustrated in FIG. 3 and exclusively serves to retransmit a necessary part of video information in accordance with a request. In this case, as described with reference to FIG. 3 in the first exemplary embodiment, the video information retransmission module 806 may retransmits a necessary part of video information in accordance with a request provided directly from the playback apparatus 102 having the retransmission request client 312. The retransmission of a necessary part of information may be performed through another module such as connection control server module 105.

Now, a main processing procedure according to the present exemplary embodiment will be described with reference to FIG. 8. The playback apparatus 102 connects to the session server 802 using an address uniquely provided by a URL so as to establish a communication session. The URL used in this processing is indicated as a URL1 810 in FIG. 8.

Once the session is established, the connection control server module 105 of the session server 802 notifies the video information transmission module 805 of requested video information and instructs the video information transmission module 805 to prepare for transmission of the video information. On the other hand, the connection control server module 105 checks if the preparation has been completed and also notifies the playback apparatus 102 of a URL2 811 as URL information for acquiring the video information from the medial server 803. At the same time, the connection control server module 105 notifies the playback apparatus 102 of a URL3 812 to designate an URL for retransmission in case of an error and allow the playback apparatus 102 to acquire retransmitted data through the video information retransmission module 806.

With this arrangement, the playback apparatus 102 can acquire means for normally receiving the video image and means for requesting data retransmission. When the playback apparatus 102 detects an error during the reception of the video information, the playback apparatus 102 can acquire a necessary part of the video information by sending a retransmission request in the similar manner to the case in the first exemplary embodiment.

To provide more specific description, an example of a case where MPEG-2 TS data is acquired using XML Web Service will be described. FIG. 9 illustrates dataflow including exchange of message for establishing a session using XML Web Service.

A request for video data from the playback apparatus 102 is first supplied to the session server 802. FIG. 9 illustrates an example of a message 911 sent in processing 901 for requesting video data to be transmitted and establishing a session. This message 911 notifies a request for acquisition (GetContent) of video content (video data) together with corresponding source information (source) in XML data format. The source information is information for identifying requested video content.

The session server 802 performs processing for internally storing the above connection to establish a session and also performs processing 902 for instructing the media server 803 to transmit actual video data. If necessary, the session server 802 performs processing 903 for providing the retransmission server 804 of the session information.

In addition, the session server 802 performs processing 904 for returning a message 914 indicating that the session is established to the playback apparatus 102 that has requested the video information. This message 914 indicates in XML data format that it is a response to the request for acquisition of the video content (GetContentResponse). With this message 914, the session ID of the established session (session), corresponding source information (source), and connection information for a retransmission request (retransmit) are returned to the playback apparatus 102.

The source information is provided with several pieces of additional information for notifying the playback apparatus 102 of details of the video information. The additional information contains connection information for a retransmission request, allowing the playback apparatus 102 to send a retransmission request as necessary.

Subsequently, the media server 803 performs processing 905 for transmitting data to the playback apparatus 102. This data is video data content. For example, when the playback apparatus 102 detects packet loss and needs the lost packet for storage, the playback apparatus 102 can perform processing 906 for requesting retransmission of the lost packet. The message to be sent from the playback apparatus 102 to the retransmission server 804 in this processing 906 is indicated as a message 916 as illustrated in FIG. 9.

As illustrated in FIG. 9, the message (Retransmit) 916 indicating a retransmission request of video information includes session information (session) for identifying a session, source information (source), and part specification information (part) for specifying a requested part of video information. This session information and source information allow the retransmission server 804 to identify video information to be retransmitted. In addition, the part specification information allows the retransmission server 804 to further identify a specific necessary part of the specified video information.

Specifically, such a specific necessary part can be identified by a timestamp (TS) 505 and a packet location (TS_packet) in a transport stream. Such a timestamp and a transport stream is information in an MPEG-2-encoded stream. However, parameters contained in a stream depend on the format of the stream.

In response to the retransmission request, the retransmission server 804 performs processing 907 for transmitting a message 917 for replaying the playback apparatus 102. In the example of FIG. 9, the message 917 indicates that it is a response to the retransmission request for the video information (RetransmitResponse) in XML data format. The message 917 contains data corresponding to the necessary part of the video data in an encoded format suitable for XML.

As described above, according to the present exemplary embodiment, a URL for retransmission is notified to a receiving terminal so that the receiving terminal can arbitrarily determine the necessity and timing of retransmission. Thus, the above arrangement is especially effective when importance is placed on both display with real-time performance and storage with data consistency.

Other Exemplary Embodiments

Embodiments of the present invention also encompass the arrangements wherein a storage medium storing a software program for realizing the functions of the above-described embodiments is supplied to a system or device having a computer (CPU or MPU) capable of reading the program code from the storage medium and executing the program code. In this case, the program code read from the storage medium is also a feature that realizes the present invention. That is, the computer program for implementing the function of the above-described embodiments may be encompassed in the present invention.

Examples of the storage medium for supplying the program code include flexible disks, hard disks, optical disks, magneto-optical (MO) disks, CD-ROMs, CD-Rs, magnetic tapes, non-volatile semiconductor memory cards, ROMs, DVDs, and so forth.

In addition to the functions of the above-described embodiment being realized by the program code read out being executed on a computer, the functions of the above-described embodiment may be realized by the Operating System (OS) running on the computer performing part or all of the actual processing based on instructions of the program code.

Moreover, the functions described above may be realized by the program code read out from the storage medium being written to memory provided to a function expansion board inserted into the computer or a function expansion unit connected to the computer, and the CPU of the function expansion board or function expansion unit performs part or all of actual processing on the basis of the instructions of the program code.

The computer program can also be supplied by connecting to a home page on the Internet using a browser of a client computer to download the computer program itself or a compressed file including an automatic installation function from the home page to a storage medium such as a hard disk.

Further, embodiments of the present invention can be realized by dividing program code constructing the program of the present invention into plural files, and downloading the respective files from different home pages. That is, embodiments of the present invention also include a WWW server holding the program file to realize the functional processing of embodiments of the present invention to be downloaded to plural users.

Further, embodiments of the present invention comprise a program that can be encrypted and stored in a storage medium such as a CD-ROM to be delivered to users, permitting a user who satisfied a predetermined condition to download key information for decryption from the home page via the Internet. By using the key information, the user installs the encrypted program into the computer to be executed.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

What is claimed is:

1. A video receiving apparatus comprising:
a receiving unit configured to receive location information corresponding to video information, and to receive the video information transmitted from a video transmitting apparatus;
an error detecting unit configured to detect an error in the video information received by the receiving unit; and
a transmitting unit configured to transmit a request for a specific part of the video information corresponding to the error detected by the error detecting unit on the basis of the location information.

2. The video receiving apparatus of claim 1, wherein the location information includes a URL representing a storage location of the video information.

3. The video receiving apparatus of claim 1, wherein the receiving unit receives the location information according to Session Description Protocol (SDP) on the basis of connection control using Real-Time Streaming Protocol (RTSP).

4. A video receiving method, the video receiving method performed in an operating environment that includes a programmable processing circuit and a memory, the memory storing a program of instructions executable by the programmable processing circuit to perform the video receiving method, the video receiving method comprising:
receiving location information and video information transmitted from a video transmitting apparatus;
detecting an error in the video information; and
transmitting a request for a specific part of the video information corresponding to the error on the basis of the location information.

5. The video receiving method of claim 4, wherein the location information includes a URL representing a storage location of the video information.

6. The video receiving method of claim 4, wherein the receiving unit receives the location information according to Session Description Protocol (SDP) on the basis of connection control using Real-Time Streaming Protocol (RTSP).

7. A computer-readable recording medium storing a program causing a computer to execute processes in a video receiving method, comprising:
receiving location information and video information transmitted from a video transmitting apparatus;
detecting an error in the video information; and
transmitting a request for a specific part of the video information corresponding to the error on the basis of the location information.

8. The apparatus of claim 1, wherein the receiving unit receives the location information during a process for determining a transmission destination of the video information.

9. The apparatus of claim 1, wherein the receiving unit receives the location information from a session server.

10. The apparatus of claim 1, wherein the location information corresponds to a retransmission server.

11. The apparatus of claim 1, further comprising an establishing unit configured to establish a session with the video transmitting apparatus, and wherein the receiving unit receives the video information while the session is established with the video transmitting apparatus.

12. The method of claim 4, wherein the location information is received during a process for determining a transmission destination of the video information.

13. The method of claim 4, wherein the location information is received from a session server.

14. The method of claim 4, wherein the location information corresponds to a retransmission server.

15. The method of claim 4, further comprising establishing a session with the video transmitting apparatus, wherein the video information is received while the session is established with the video transmitting apparatus.

16. The medium of claim 7, wherein the location information includes a URL representing a storage location of the video information.

17. The medium of claim 7, wherein the location information is received during a process for determining a transmission destination of the video information.

18. The medium of claim 7, wherein the location information is received from a session server.

19. The medium of claim 7, wherein the location information corresponds to a retransmission server.

20. The medium of claim 7, further comprising establishing a session with the video transmitting apparatus, wherein the video information is received while the session is established with the video transmitting apparatus.

* * * * *